(12) United States Patent
de Queiroz (10) Patent No.: US 7,313,696 B2
(45) Date of Patent: Dec. 25, 2007

(54) METHOD FOR AUTHENTICATION OF JPEG IMAGE DATA

(75) Inventor: Ricardo L de Queiroz, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 659 days.

(21) Appl. No.: 10/200,819

(22) Filed: Jul. 22, 2002

(65) Prior Publication Data

US 2004/0013268 A1    Jan. 22, 2004

(51) Int. Cl.
 *H04L 9/00*    (2006.01)
(52) U.S. Cl. .................. 713/168; 713/176; 380/203
(58) Field of Classification Search ............... 380/201, 380/203; 713/168, 176
 See application file for complete search history.

(56) References Cited

U.S. PATENT DOCUMENTS

| | | | |
|---|---|---|---|
| 5,499,294 A | 3/1996 | Friedman | 380/10 |
| 5,646,997 A | 7/1997 | Barton | |
| 5,748,783 A | 5/1998 | Rhoads | |
| 5,764,770 A | 6/1998 | Schipper et al. | 380/25 |
| 5,822,458 A | 10/1998 | Silverstein et al. | 382/235 |
| 5,862,218 A | 1/1999 | Steinberg | 380/10 |
| 5,875,249 A | 2/1999 | Mintzer et al. | |
| 5,895,779 A | 4/1999 | Boffa | 508/555 |
| 6,005,936 A | 12/1999 | Shimizu et al. | 380/4 |
| 6,332,030 B1 | 12/2001 | Manjunath et al. | |
| 6,400,996 B1 | 6/2002 | Hoffberg et al. | |
| 6,532,541 B1 * | 3/2003 | Chang et al. | 713/176 |
| 6,785,815 B1 | 8/2004 | Serret-Avila et al. | |
| 6,823,075 B2 | 11/2004 | Perry | |
| 6,823,076 B2 | 11/2004 | Cahill et al. | |
| 6,850,252 B1 * | 2/2005 | Hoffberg | 715/716 |
| 6,889,324 B1 * | 5/2005 | Kanai et al. | 713/176 |
| 6,912,658 B1 | 6/2005 | Glogau et al. | |
| 2002/0090108 A1 | 7/2002 | Rhoads | |
| 2002/0146123 A1 | 10/2002 | Tian | |
| 2003/0217255 A1 | 11/2003 | Wyatt | |
| 2004/0015695 A1 | 1/2004 | de Queiroz | |
| 2004/0015696 A1 | 1/2004 | de Queiroz | |
| 2004/0015697 A1 | 1/2004 | de Queiroz | |
| 2004/0017925 A1 | 1/2004 | Marvel et al. | |

OTHER PUBLICATIONS

Authentication and access control in the JPEG 2000 Compressed domain by Raphael Grosbois, Pierre Gerbelto, Touradj Ebrahimi☐☐SPIE 46th Annual Meeting, Applications of Digital Image Processing Jul. 29-Aug. 3, 2001.☐☐Retrieved date Nov. 2, 2005.*

(Continued)

*Primary Examiner*—Gilberto Barrón, Jr.
*Assistant Examiner*—Samson Lemma (57) ABSTRACT

A method enables a recipient of JPEG image data to authenticate the JPEG image data by producing a hashing function from a first section of the JPEG image data. A first integrity checking value is produced from the hashing function produced from the first section of JPEG image data and, from a least significant transmitted bit-plane of a second section of the JPEG image data, an embedded encrypted signature string is extracted and decrypted to generate a second integrity checking value. The first and second integrity checking values are compared and the first section of the JPEG image data is authenticated when the second integrity checking value matches the first integrity checking value.

12 Claims, 6 Drawing Sheets

OTHER PUBLICATIONS

Ping Wah Wong Hewlett Packard Company, A public Key Watermark for Image Verification and Authentication, 1998, IEEE☐☐Retrieved Date Mar. 10, 2006 pp. 455-459.*

An article entitled: "*JPEG 2000: Overview Architecture and Applications*", by Gormish et. al., in *Proceedings of the IEEE International Conference in Image Processing*, Vancouver, Canada, 2000.

The article "*A Public Key Watermark for Image Verification and Authentication*" authored by P. Wong, which appears at the *IEEE Proceedings of the International Conference on Image Processing*, Chicago IL 1998.

The article entitled: "*Watermarking of Digital Image and Video Data*", by Langelaar et. al., IEEE Signal Processing Magazine, pp. 20-46, vol. 17, No. 5, Sep. 2000.

The article "*Image with self-correcting capabilities*", by J. Fridrich and M. Goljan, which appears at the Proceedings of the *IEEE International Conference on Image Processing*, Kobe, Japan, Oct. 1999.

Schneier, D. Applied Cryptography; John Wiley & Sons; 1996, pp. 584-587.

Chen et al.; Analysis and Architecture Design of EBCOT fro JPEG-2000. conference Proceedings of the 2001 IEEE International Symposium on Circuits and Systems (IACAS); May 2-9, 2001; vol. II, pp. 765-768.

Martina, M.; JPEG2000 Decoder Architecture for Mobile Applications; Oct. 11-12, 2001; pp. 1-5.

Ching-Yung Lin; Shih-Fu Chang. A robust image authentication method distinguishing JPEG compression from malicious manipulation; IEEE Transactions on Circuits and Systems for Video Technology, vol. 11, No. 2, pp. 153-168, Feb. 200100.

Fridrich, J.; Goljan, M.; Rui Du. Invertible authentication watermark for JPEG images; Information Technology: Coding and Computing, 2001. Proceedings. International Conference on Apr. 2-4, 2001 pp. 223-227O D.

Kundur, D.; Hatzinakos, D..Digital watermarking for telltale tamper proofing and authentication; Proceedings of the IEEEvol. 87, Issue 7, Jul. 1999 pp. 1167-1180.

\* cited by examiner

METHOD FOR AUTHENTICATION OF JPEG IMAGE DATA

RELATED APPLICATIONS

Attention is directed to commonly owned and assigned copending Application Numbers:

U.S. Ser. No. 10/200,895, filed Jul. 22, 2002 entitled "SYSTEM AND METHOD FOR AUTHENTICATION OF JPEG IMAGE DATA".

U.S. Ser. No. 10/200,925, filed Jul. 22, 20002 entitled "SYSTEM AND METHOD FOR AUTHENTICATION OF JPEG IMAGE DATA".

U.S. Ser. No. 10/200,872, filed Jul. 22, 2002 entitled "SYSTEM AND METHOD FOR AUTHENTICATION OF JPEG IMAGE DATA".

FIELD OF THE INVENTION

The present invention is directed to methods for authentication of transform coded images and, more particularly, to methods of authentication of JPEG compressed images which allow the receiver to ascertain whether the received image originated from a certain identified source or whether the image data has been altered at some point after transmission but prior to receipt.

BACKGROUND OF THE INVENTION

In the arts, encryption of image data is often used as a means for ensuring that only authorized persons/entities can decode a transmitted file which has been encrypted using some mechanism. Having access to the image and the proper decryption key, the recipient of the transmitted file/message can decode the information contained therein. There are several methods to encrypt the data which are relatively widely known in the arts. Most notably are methods wherein the single key necessary to decrypt the data is held in secret by both the sender and receiver. As such, only possession of the same key as the one used by the transmitter to encrypt the data will enable proper decoding of the received file.

However, public keys have since gained favor in the arts. Public keys allow one to encrypt data using one key and the receiver to decrypt the transmitted file using another key. In such a manner, one can make either the encrypting or decrypting keys public but does not have to reveal both keys. In this way, one is able to send or receive information securely without any one person being in possession of both keys. In the case wherein the decryption key is made public, the data is said to be "signed", (i.e., it can be decrypted by anyone with knowledge of the signature which identifies which decryption key to utilize). In this manner, nobody can recreate the encryption used because the encryption key is held in secret and is not available to the public.

Watermarking, on the other hand, embeds extra data into the original input data which is supposed to be "invisible" so that the authorized receiver of the transmitted file can authenticate the sender. However, an unauthorized receiver of the transmitted file may be able to recognize the originality of the embedded watermark and thereby recognize its author. Also, watermarks are relatively easy to reproduce with modern computing and graphic arts equipment thus enabling an unknown third-party to send files to recipients who, in turn, believe them to be originals sent by somebody they recognize as the author of the embedded watermark.

The invention herein disclosed deals with images and image compression techniques utilizing, in part, standard as well as non standard compression systems based on the transformation of the image data. One widely used method for compression of gray and color images is the JPEG image compression standard. The book entitled: "*JPEG: Still Image Data Compression System*", by Pennebaker and Mitchell, Van Nostrand Reinhold, 1992, (incorporated herein by reference), is a rather authoritative reference on JPEG and adequately describes most, if not all, of its relevant aspects. JPEG is based on the Discrete Cosine Transform (DCT) of an image. The book also describes in detail techniques regarding DCT techniques and implementations.

Another aspect of this invention is related to JPEG 2000, an image compression technique aimed as replacing JPEG as a new standard. An article entitled: "*JPEG 2000: Overview Architecture and Applications*", by Gormish et. al., in *Proceedings of the IEEE International Conference in Image Processing*, Vancouver, Canada, 2000, (incorporated herein by reference), provides an overview of the JPEG 2000 image compression method. Details of this method can be found in the standards documentation: ISO/IEC IS 15444-1 entitled: "*JPEG 2000: Image Coding System*". JPEG 2000 is based on the wavelet transform of an image.

The book entitled: "*Wavelets and Sub-band Coding*", by Vetterli and Kovacevic, Prentice-Hall, 1995, (incorporated herein by reference), teaches the operation of wavelet transforms of an image.

The article "*A Public Key Watermark for Image Verification and Authentication*" authored by P. Wong, which appears at the *IEEE Proceedings of the International Conference on Image Processing*, Chicago Ill. 1998, discloses a method to authenticate a digital image by means of computing a hash function correlated with the contents of the most significant bit planes of the image, and by embedding the said hash function into the least significant bit plane of the image.

The article entitled: "*Watermarking of Digital Image and Video Data*", by Langelaar et. al., IEEE Signal Processing Magazine, pp.20-46, Vol.17, No.5, Sept. 2000, (incorporated herein by reference), presents a general overview of image watermarking techniques. The article describes a method to embed data into JPEG compressed images by modifying the sum of the DCT coefficients.

The article "*Images with self-correcting capabilities*", by J. Fridrich and M. Goljan, which appears at the Proceedings of the *IEEE International Conference on Image Processing*, Kobe, Japan, October 1999, discloses a method to self embed image contents within the image data itself for providing self correcting mechanisms in case of corruption. The method relies on embedding compressed data of some image portions into the least significant bits of other image regions. According to said reference, each image block can be compared to the information stored in other blocks of the image, to detect and correct changes posterior to the inclusion of the self correcting information.

U.S. Pat. No. 5,764,770 entitled: "Image Authentication Patterning", to Schipper et. al., (incorporated herein by reference), discloses an apparatus for producing a self-authenticating visual image of a selected view using a digital camera with a position determining system. The image's position information is incorporated in a digital image by altering selected pixel bit values for a selected authentication pattern of pixels in a chosen subset of the pixel array; wherein authentication pattern is determined using the image's position information. The position information also may be encrypted and stored separate from the image itself. The authentication pattern is then represented by an authentication key (i.e., a single number or an ordered sequence of numbers) that is transmitted with the modified digital image along with the incorporated position information. The authentication pattern is preferably chosen so that any circle or other connected pixel region of diameter at least equal to a selected number contains at least one pixel from the chosen subset. The pixel array may be overlaid by a set of polygons, such as triangles, rectangles, parallelograms or hexagons, with at least one pixel from the chosen subset embedded in each polygon.

U.S. Pat. No. 6,005,936 entitled: "System For Embedding Authentication Information Into an Image and an Image Alteration Detecting System", to Shuichi et. al., discloses a method to embed authentication information into an image in order for the receiver to detect the identity of a received photographic image. By supplying the authentication information integrally with the image data, the recipient is able to verify the image without the necessity of having to save the authentication information by converting the light inputted through an optical system to an electric signal, a CCD outputs an analog signal of an image which is converted to a digital signal. In response to the digital signal of the image a digital camera having region dividing capability divides the digital image into first and second regions. Authentication information is then generated from data in a first region and then encrypted. The encrypted authentication information is subsequently embedded into a second image region. The first and second image regions are then combined.

U.S. Pat. No. 5,898,779 entitled: "Photographic System With Selected Area Image Authentication", to Squilla et. al., discloses a public key encryption for authenticating an image which includes a digital camera having embedded therein a private key unique to that particular camera. A known public key uniquely based upon the private key is used to decrypt digital data from that camera in order to establish authenticity of an image. The encryption system further comprises means for generating one or more patterns each composed of at least one individual area that is visible together with the image of the object, means for designating at least one individual area as an active area of the image suitable for authentication and for generating location data identifying the active area, and means for calculating an image hash from image data of the active area of the image using a predetermined hash algorithm. The image hash is then encrypted with the embedded private key thereby producing a digital signature uniquely associated with the active area of the image, the image data, the digital signature, and the location data of the active area stored in a digital record. By confining encryption to this selected region of interest, power requirements for subsequent hashing and encryption are reduced thus providing an advantage for portable devices.

U.S. Pat. No. 5,499,294 entitled: "Digital Camera with Apparatus for Authentication of Images Produced from an Image File", to Friedman, discloses a digital camera equipped with a processor for authentication of images produced from an image file taken by the digital camera. The digital camera processor has embedded therein a private key unique to it, and the camera housing has a public key that is uniquely related to the private key such that digital data encrypted with the private key may be decrypted using the public key. The digital camera processor comprises means for calculating a hash of the image file using a predetermined algorithm, and second means for encrypting the image hash with the private key, thereby producing a digital signature. The image file and the digital signature are stored in suitable recording means so they will be available together. Apparatus for authenticating the image file as being free of any alteration uses the public key for decrypting the digital signature, thereby deriving a secure image hash identical to the image hash produced by the digital camera and used to produce the digital signature. The authenticating apparatus calculates from the image file an image hash using the same algorithm as before. By comparing this last image hash with the secure image hash, authenticity of the image file is determined if they match. Other techniques to address time-honored methods of deception, such as attaching false captions or inducing forced perspectives, are included.

U.S. Pat. No. 5,862,218 entitled: "Method and Apparatus for In-Camera Image Marking and Authentication", to Steinberg, discloses a camera with a built in microprocessor system programmed to receive an input password and indicia from a host computer. The camera is configured to use the indicia in combination with a conversion formula to mark an original acquired image in a non-destructive manner to form modified image data and add the indicia to an image header. The camera also creates image authentication data for comparison with corresponding data of a questionable second image to determine if the second image is the same as or different from the original image. This process of marking and creating authentication data all occur during acquisition and prior to any image data storage in a medium from which a person could subsequently access data. The camera takes the authentication data and stores it along with the marked image data in memory for subsequent transmission to the host computer. The authentication involves the creation of checksum data, involving the addition of pixel values from each image row and each image column. These sums are then stored in a lookup table for future use in comparing with the result of the same checksum calculation done on questionable image data at a future time. The original image can be viewed only through presentation of the password.

U.S. Pat. No. 5,822,458 entitled: "Precomputing and Encoding Compressed Image Enhancement Instructions", to Silverstein et. al., (incorporated herein by reference), discloses a method to enhance a decompressed image.

The "*Handbook of Applied Cryptography*", by Menezes et. al., CRC Press, 1998, (incorporated herein by reference), described basic algorithms for cryptography and data hashing.

What is needed in this art is a method for encoding verification information into JPEG image data files prior to transmission to an intended recipient by the file's author and which enables the recipient to decode the verification information so as to ascertain whether the received image file originated from a known identified source and/or whether the contents of the file have been altered in some fashion prior to receipt.

SUMMARY OF THE INVENTION

What is disclosed is a method for authentication of JPEG image data prior to transmission to an intended recipient which enables the recipient to ascertain whether the received image file originated from a known identified source or whether the contents of the file have been altered in some fashion prior to receipt.

To encode verification information in accordance with the present invention, a unique hashing function is derived from a first section of image data contained in the JPEG compressed image in such a way that any changes subsequently made to said first section of image data would be reflected in a different hashing function being derived therefrom. The hashing function is subsequently encrypted into a signature string. The signature string is then embedded into a next section of the image data. The process is repeated until all sections of image data have been processed. On the very last data section, the hashing function is self-encoded. As the embedding of a previous section's integrity checking number is done without modifying the JPEG bit stream any JPEG decoder found in the arts can thereafter properly decode the image. The image file is then transmitted to an intended recipient.

To decode the embedded verification information in accordance with the present invention upon receipt of the JPEG image file by the recipient a first hashing function is computed by the recipient from a first section of image data contained in the received image file. A second section of data is identified wherein the signature string for the first section of data had been embedded. The signature is then decoded from the data. The signature string is thereafter decrypted to yield the hashing function contained therein. The two hashing functions are then compared against each other. If the first hashing function matches the hashing function contained in the retrieved signature string which had been previously embedded therein by the author then it can be ascertained that the image data for that first section is authentic. The process is repeated for each successive section of data until all the data sections of the image file have been processed.

Other objects, advantages, and salient features of the invention will become apparent from the detailed description which, taken in conjunction with the drawings, disclose the preferred embodiments of the invention.

DESCRIPTION OF THE DRAWINGS

The preferred embodiment and other aspects of the invention will become apparent from the following detailed description when taken in conjunction with the accompanying drawings which are provided for the purpose of describing the invention and not for the limitation thereof, in which.

DETAILED DESCRIPTION OF THE INVENTION

What is disclosed is a method for authentication of JPEG image data prior to transmission to an intended recipient which enables the recipient to ascertain whether the received image file originated from a known identified source or whether the contents of the file have been altered in some fashion prior to receipt.

At the onset, it is important to point out that one skilled in this art should be readily familiar with data encryption techniques and methods for embedding data within various file formats. As used herein, a block refers to a group of 8×8 transformed coefficients. A section as used herein designates a group which contains a reasonable number of blocks dictated by the amount of data that can be reliably embedded in each section. A group of blocks may or may not be contiguous within a section.

Figure 1:
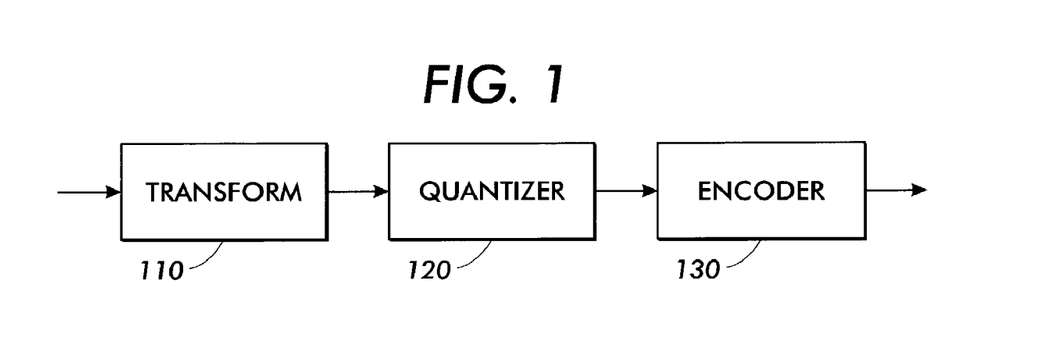
FIG. 1 illustrates the series of compression operations generally performed on images in order to compress them in compliance with recognized JPEG standards.
Figure 2:
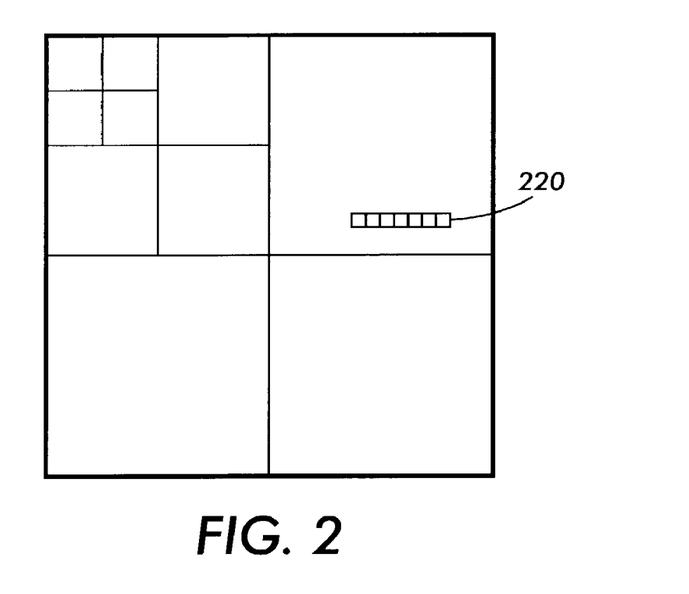
FIG. 2 is a diagram of the sub-bands obtained via hierarchical sub-band decomposition of an image.

Attention is now directed to FIG. 1 which illustrates with generality a series of operations performed on image data in order to compress it with techniques known in the arts. In general, individual pixels of an image are first transformed into another domain using either a Discrete Cosine Transform (DCT) or a Wavelet Transform (WT). In the DCT domain, the image is divided into blocks of 8×8 (64) pixels and each block is thereafter transformed into a block of DCT coefficients wherein the lowest frequency transformed sample is the DC coefficient (DCC) while the remaining 63 samples are the AC coefficients (ACC) whereafter the quantized coefficients are arranged into a vector V by scanning the 8×8 blocks preferably following a zigzag pattern. Vector V can then be encoded using a combination of run-length-counting (RLC) and variable-length coding (VLC). In the WT domain, the image is transformed by successive stages of filtering thereby yielding sub-bands which contain the Wavelet Transformed coefficients (WTC) relative to a particular spectral band of the image. All the derived coefficients (DCC, ACC or WTC) are then preferably translated by a quantizer. Quantization is typically performed by converting the coefficients into some fixed point numerical representation by dividing by an integer and rounding the result. In the DCT domain, the quantized data is preferably represented by a fixed point representation with each DCT coefficient represented by its sign and magnitude. In the WT domain, the coefficient's magnitudes are preferably represented by a number of bits and sub-bands are represented by bit planes or bit slices of the image data. the coefficient's magnitudes are preferably represented by a number of bits and sub-bands are represented by bit planes or bit slices of the image data. A typical representation of the wavelet coefficients of a JPEG/WT encoded image generally follows the scheme in FIG. 2 (which should be recognizable by one skilled in the art of JPEG compression techniques as a diagram of the sub-bands obtained via hierarchical sub-band decomposition of said image). The transformed and quantized data can then be encoded into a binary stream via an entropy encoder 130.

Figure 3:
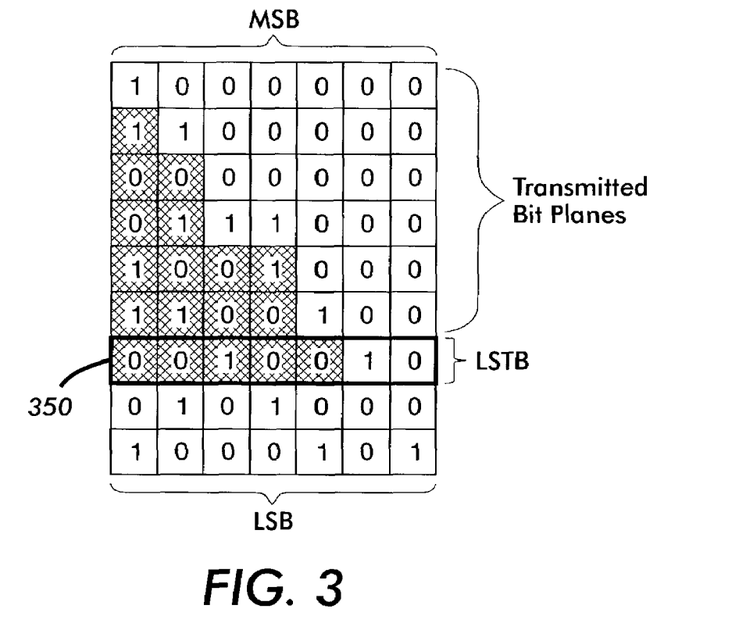
FIG. 3 illustrates the bit slices from a row of coefficients 220 of a given sub-band of a WT representation of an image.
Figure 4:
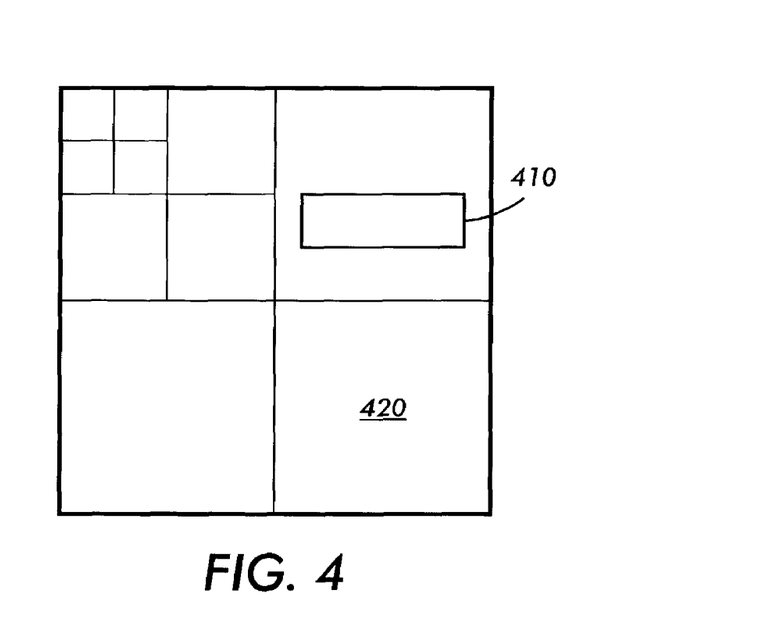
FIG. 4 depicts the location of a section in a sub-band of a wavelet transformed image.
Figure 5:
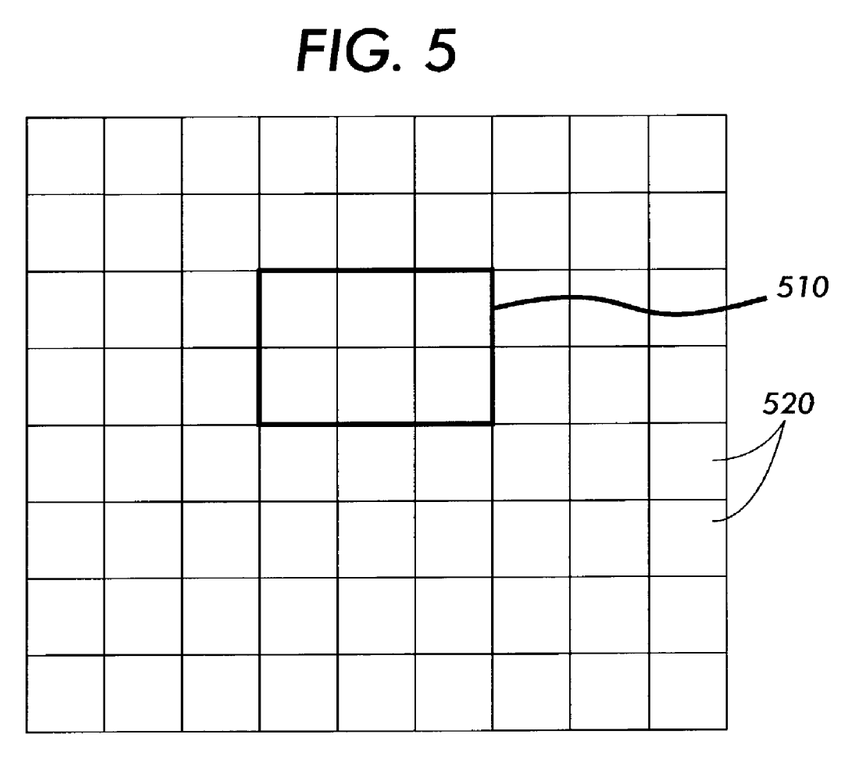
FIG. 5 depicts the section 510 in the context of DCT/JPEG wherein the 8×8 blocks 520 are clearly marked.

Attention is now directed to FIG. 3 which illustrates the bit planes (or slices) from a row of WT coefficients 220 of a sub-band of a JPEG/WT compressed image. Bit planes are usually encoded sequentially. The slice of the most significant bits is typically encoded first because image data is often transmitted from the Most Significant Bit (MSB) to the Least Significant Bit (LSB). The last transmitted bit plane would then be the Least Significant Transmitted Bit-plane (LSTB) shown at 650. However, it is not uncommon that the LSTB plane never reaches the LSB plane level. Successive bit planes are divided into one or more blocks and encoded via a contextual arithmetic coder until some stopping criteria is met (e.g., filling of a buffer, etc.). Alternatively, bit-planes can also be prioritized by sub-band so that all bit planes for one sub-band are encoded before those of another sub-band (or all sub-bands can be treated equally). FIG. 4 depicts the location of a section of blocks in a sub-band of a JPEG/WT compressed image. FIG. 5 depicts a section 510 of blocks 520 of a JPEG/DCT compressed image.

Figure 6:
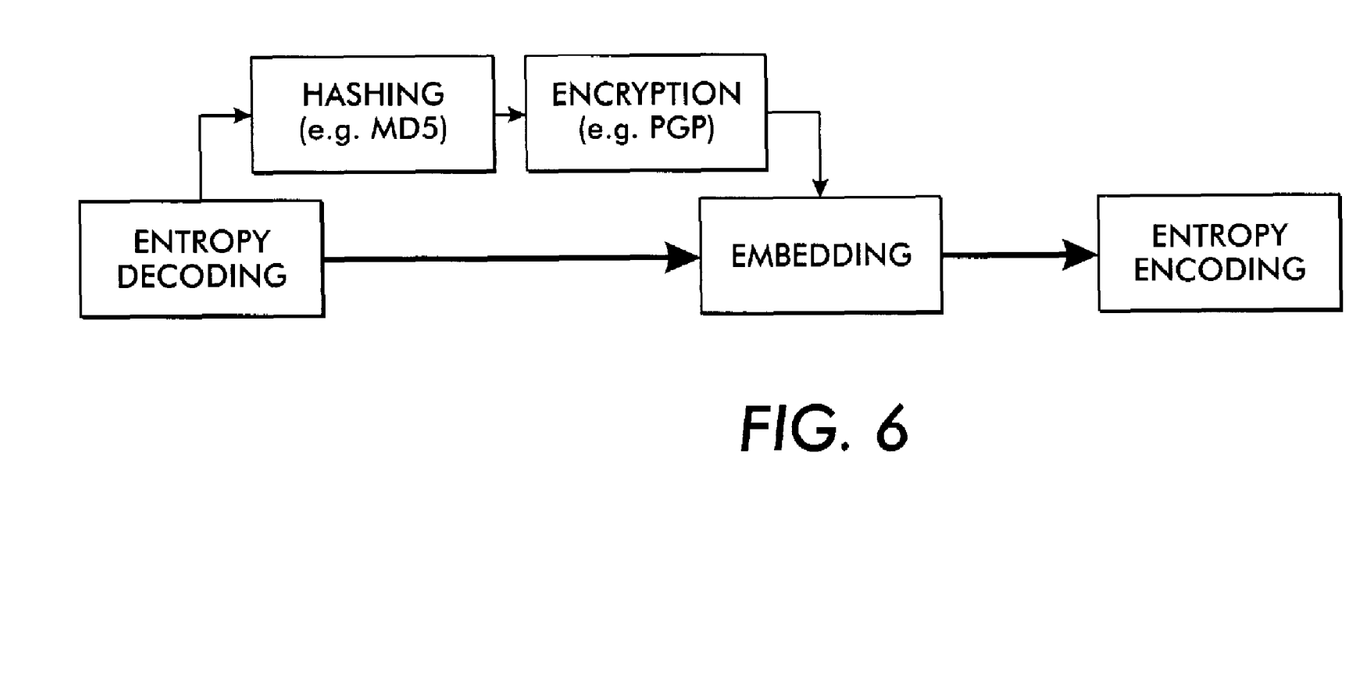
FIG. 6 illustrates the hashing, encrypting, and embedding steps of the authentication method of the present invention.

With regard to the encoding method of the present invention, attention is now directed to FIG. 6 where, in a first step in accordance with the present method, a hashing function is derived from a first section of image data in such a way that any changes subsequently made to that section of data would necessarily reflect in a different hashing function being derived therefrom. This hashing function produces a number P. The number P is then encrypted into a signature string Q. Signature string Q is then embedded into a next section of the image data. The process repeats itself for all sections of data. At the last section of data, the signature string is self-embedded into the data. The image data can then be transmitted to an intended recipient or the sections can be transmitted to the intended recipient sequentially upon completion of a section's integrity checking processing.

Figure 7:
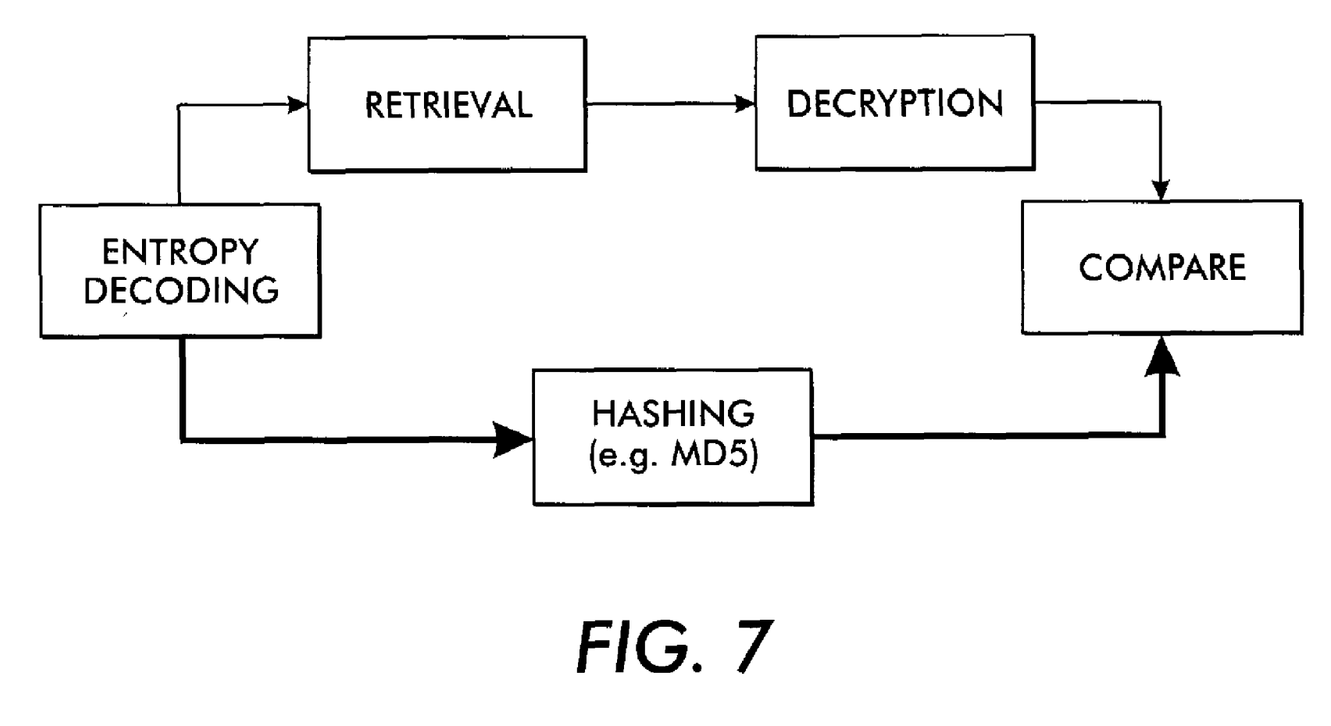
FIG. 7 illustrates the steps to authenticate the author.

Attention is now directed to FIG. 7 which illustrates the steps of the present invention to decode received image data for authentication. A first section of data is identified and the received computes a hashing function from said first section of received data. A first number $P_1$ is generated therefrom. A second successive section of image data is identified. A signature string Q embedded is identified and decoded from the data. The signature string is then decrypted to yield the hashing function number $P_2$ contained therein. Numbers $P_1$ and $P_2$ are compared. If there is a match then the first section of data is authenticated. The processes repeats itself for each section of data with successive data sections having encoded therein an embedded signature string wherein the previous section's integrity checking number lies encrypted. The process repeats itself until all sections of the data file have been identified and authenticated.

Figure 8:
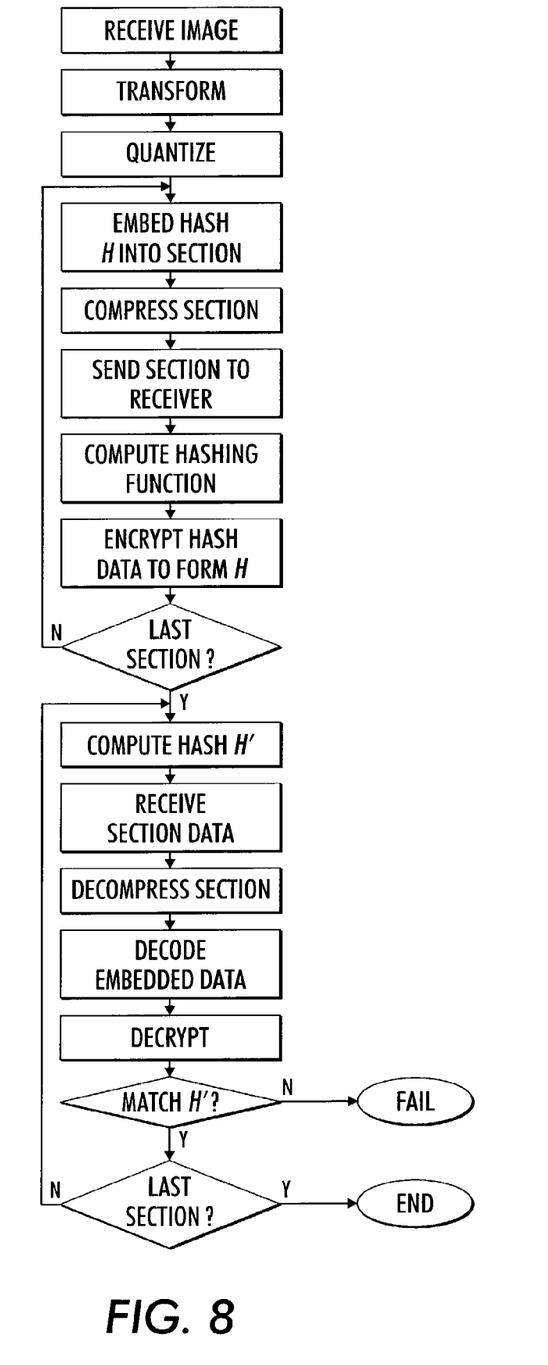
FIG. 8 shows a block diagram of the technique of the present invention wherein signature computation (hashing and encryption) is performed on a section at a time.

Attention is now directed to FIG. 8 showing a block diagram wherein the computation of signature string Q is performed on one section of data at a time. In this instance, a hashing function is computed from the quantized coefficients of the image data contained in a section producing number P. Number P is encrypted to yield signature string Q which is then embedded into that data section. The section of data containing the embedded signature is then encoded and transmitted to the intended recipient. The process is repeated until all sections of data have been processed.

At the receiver side, authentication is accomplished by decoding a first section of data in order to recover the quantized coefficients corresponding to that section of data. A hashing function is derived from the quantized coefficients producing a first number P'. The next section of data is identified and decoded to remove therefrom the embedded signature string Q. Signature string Q is subsequently decrypted in order to obtain the number P''' embedded therein associated with the previous data section. Number P''' is then compared to P' at comparison stage. If a match cannot be verified then the associated section cannot be authenticated. Otherwise, the section is authenticated. A hashing function is subsequently derived from the quantized coefficients of the next section of received data which generates yet another number P'. The signature string embedded the next section of data is decoded therefrom and decrypted to yield the previous section's number. The values are then compared as a means for authentication. The process is repeated until all sections of data have been processed.

With regard to the last section of data, the hashing function number is self embedded. Self embedding differs from the sequential method of verifying section after section of data as previously discussed in that each section of data to be processed is first divided into two parts. A first data part consists of data to be used to compute the hashing function. A second part being used to embed the associated signature string containing therein the encrypted integrity checking number. A hashing function is computed from all the quantized data in a particular section including the MSB plane and the planes in between the MSB and LSTB planes with the LSTB excluded. The signature string of a particular section is then embedded into said second data part by modifying the bits of the LSTB plane of the quantized coefficients.

The procedure to embed bits into each block can be more formally described as follows. Let V(n) be a vector formed by the NB entries of a block. For JPEG/DCT, the samples are the ACC in an 8×8 block. Thus, NB=63. For JPEG/WT, a block is a partition of a sub-band whose size can vary depending on compression parameters. If we denote S to be the sum of all absolute quantized samples up to the LSTB in a block, we get:

$$\sum_{n=1}^{NB} |V(n)| = S.$$

Information is embedded into a particular block by setting the parity of S.

For example, to embed 1 bit in each block we force S to have even or odd parity. In order to embed 2 bits we force parity modulo 4.

| Bit | S | Bits | S mod 4 |
| --- | --- | --- | --- |
| 0 | even | 00 | 0 |
| 1 | odd | 01 | 1 |
|  |  | 10 | 2 |
|  |  | 11 | 3 |

The samples V(n) are considered in absolute value and their absolute values ($A_n$) are $A_n = C_n 2 + B_n$, where $B_n$ is the LSTB of $A_n$, and $C_n$ corresponds to the remaining bits. One skilled in this art would appreciate that one can embed K bits by computing S modulo $M=2^K$. One way to force parity is to reduce S whenever possible. Given that a block has $S=S_o$ and the K-bit code word to be embedded is R (R<M), then $S_f = mM + R$ where m is chosen to be the greatest integer such that ($S_f \leq S_o$). If $D = S_f - S_o$ then we modify the vector D times. At each time, one entry is adjusted by reducing its absolute value by 1. For small K and small compression ratios, embedding can be done transparently, (i.e., the images with and without embedding are visually indistinguishable after JPEG decompression). It should be understood that reduction of values is not always possible nor always advantageous. One way to perform the embedding is as follows. The decision to make the block available for embedding K bits depends on the quantities of E and F, where:

$$E = \sum_{n=1}^{NB} B_n$$

and F is number of $B_n$ that are non-zero. We check whether ($E > T_1$) and ($F \geq T_2 \geq K$) wherein $T_1$ and $T_2$ are predefined constants. If both conditions are satisfied then the block is considered for embedding data. The parity of the sum of all An (i.e., S) is adjusted by modifying the $A_n$ for which $B_n$ is non-zero. To achieve this, we try to toggle bits 1→0, (i.e., reduce the coefficient's amplitude). If that is not possible then toggling in the reverse direction is performed. It is preferable to embed 1 or 2 bits per block while $T_1$ can be made 5 or 10. The capacity C of a compressed image is the number of bits that can be embedded in the bit-stream, given $T_1$, $T_2$ and K, (i.e., K times the number of blocks for which conditions are satisfied). It is assumed the blocks in a section have a capacity larger than necessary to accommodate the signature Q. One example for the selection of which V(n) is to be reduced is to reduce the entry which has the smallest quantization step in order to minimize the mean-squared-error caused by the manipulation. In order to maintain quality levels, it is advisable to only modify a block if (S>T) for properly chosen T to modifying more levels than the block would support to maintain good visual quality. Furthermore, it is also advisable to not modify V(n) which are 1's, (i.e., to knock down the coefficient to zero).

Embedding, in the manner described, is generally invisible. For 1 bit and T1=5, F is always satisfied and using default quantizer tables in JPEG (quality factor 75) there is a typical capacity (in bits per block) which is roughly 0.3-0.7. For a full page 8.5×11 in at 600 ppi that would translate into a capacity of roughly 50K bytes (large thresholds and K=1). In 50KB one can embed a lot more information than the integrity checking alone so embedding can be used for additional purposes. For example, one can replicate the hashing data, or convolve with a watermark. This would involve computing a hashing function in order to obtain integrity checking data. One can use traditional hashing function such as CRC or MD5. It is known to those skilled in the art that hashing functions of about 128 bits are generally considered safe in the sense that it is generally difficult to compute another set of data with the same hashing using only standard computer equipment. In other words, 128 bit signatures are generally deemed safe against malicious attacks. There are several standard encryption algorithms that can be used in the practice of the present invention. One example is the PGP algorithm, which relies on asymmetric (private and public) keys. Assuming the check sums and hashing functions are perfect, the degrees of freedom for some malicious person to deceive the checking is limited to modifying the LSTB of the magnitude of any of the coefficients which are greater than 1. If all those bits are modified, typically the image would still retain its quality.

In terms of the error probabilities, assuming that the distribution of S is uniform at least across modulo M, the probability of a coincidental image is $2^{-b}$ where b is the number of bits embedded. The probability of deceiving the check sums, apart from tweaking the least significant bit of some coefficients, is not as negligible but still remains relatively quite small for a well chosen algorithm such as PGP. The error in detecting the image is the error committed by falsely detecting a signed image and the error of failing to detect or authenticate that signature. To modify the incoming image while maintaining the signature one can extract the encrypted data and maintain it encrypted and change the data so that the integrity check is maintained, i.e., to deceive the receiver's checking algorithm by the following: P(false)=P(coincidental image)+P(forged encryption)+ P(deceiving check sums). In addition, false detection can occur if there is an image that coincidentally passes the checking test or whether a third party has somehow forged a signature. On skilled in the arts would understand that, in order to forge a signature on a different image, one has to first break or crack the encryption algorithm. The degree of these possibilities or probabilities depends almost entirely on the complexity of the encryption and embedding algorithms used by the identifiable source.

In summary, what has been disclosed is a method for authentication of JPEG image data prior to transmission to an intended recipient which enables the recipient to ascertain whether the received image file originated from a known identified source or whether the contents of the file have been altered in some fashion prior to receipt. In accordance to the present invention, to encode verification information a unique hashing function is derived from a first section of image data contained in the JPEG compressed image in such a way that any changes subsequently made to said first section of image data would be reflected in a different hashing function being derived therefrom. An integrity checking number is produced from the first section's derived hashing function. The integrity checking number is subsequently encrypted into a signature string. The signature string is then embedded into a next section of the image data. The process is repeated until all sections of image data have been processed. The signature string corresponding to the very last section of data is self-embedded therein. As the embedding of a previous section's integrity checking number is done without modifying the JPEG bit stream any JPEG decoder found in the arts can thereafter properly decode the image. The image file is then transmitted to an intended recipient.

In accordance with the present invention, to decode the embedded verification information upon receipt of the JPEG image file by the recipient a hashing function is computed by the recipient from a first section of image data contained in the received image file. A second section of data is identified wherein the signature string for the first section of data had been embedded. The signature is then decoded from the data. The signature string is thereafter decrypted to yield the hashing function (integrity checking) number contained therein. The two numbers are then compared against each other. If the first checking number matches the number contained in retrieved signature string which had been previously embedded therein by the author then it can be ascertained that the image data for that first section is authentic. The process is repeated for each successive section of data until all the data sections of the image file have been processed.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A method for enabling a recipient of an image file of JPEG image data to authenticate the image file of JPEG image data, the image file of JPEG image data having a first section and a second section, the first section containing a predetermined number of blocks of transformed coefficients and the second section containing a predetermined number of blocks of transformed coefficients, comprising:
   (a) producing a hashing function from the first section of the image file of JPEG image data;
   (b) producing a first integrity checking value from the hashing function produced from the first section of the image file of JPEG image data;

(c) identifying the second section of the image file of JPEG image data, the second section having an encrypted signature string embedded in a least significant transmitted bit plane block of the second section;

(d) extracting, from the least significant transmitted bit-plane of the second section of the image file of JPEG image data, the embedded encrypted signature string;

(e) decrypting the extracted signature string to recover a second integrity checking value;

(f) comparing the recovered second integrity checking value with the first integrity checking value;

(g) authenticating the first section of the image file of JPEG image data when the recovered second integrity checking value matches the first integrity checking value; and (h) informing the recipient of the image file of JPEG image data that the image file of JPEG image data is authentic when each section of the image file of JPEG image data has been authenticated by comparing the recovered integrity checking value of each section with the produced integrity checking value of each section.

2. The method as claimed in claim 1, wherein said blocks of transformed coefficients within a section are contiguous.

3. The method as claimed in claim 1, wherein said blocks of transformed coefficients within a section are non-contiguous.

4. The method as claimed in claim 1, further comprising:
(i) producing a hashing function from the second section of the image file of JPEG image data;
(j) producing a second integrity checking value from the hashing function produced from the second section of the image file of JPEG image data;
(k) identifying a third section of the image file of JPEG image data, the third section having an encrypted signature string embedded in a least significant transmitted bit-plane block of the third section;
(l) extracting, from the least significant transmitted bit-plane block of the third section of the image file of JPEG image data, the signature string embedded in the third section;
(m) decrypting the signature string extracted from the third section of the image file of JPEG image data to recover a third integrity checking value;
(n) comparing the recovered third integrity checking value with the produced second integrity checking value; and
(o) authenticating the second section of the image file of JPEG image data when the recovered third integrity checking value matches the produced second integrity checking value.

5. The method as claimed in claim 4, further comprising:
(p) producing a hashing function from a third section of the image file of JPEG image data;
(q) producing a third integrity checking value from the hashing function produced from the third section of the image file of JPEG image data;
(r) identifying a fourth section of the image file of JPEG image data, the fourth section having an encrypted signature string embedded in a least significant transmitted bit-plane block of the fourth section;
(s) extracting, from the least significant transmitted bit-plane block of the fourth section of the image file of JPEG image data, the signature string embedded in the fourth section;
(t) decrypting the signature string extracted from the fourth section of the image file of JPEG image data to recover a fourth integrity checking value;

(u) comparing the recovered fourth integrity checking value with the produced third integrity checking value; and (v) authenticating the third section of the image file of JPEG image data when the recovered fourth integrity checking value matches the produced third integrity checking value.

6. The method as claimed in claim 1, further comprising:
(i) producing a hashing function from a last section of the image file of JPEG image data;
(j) producing a self integrity checking value from the hashing function produced from the last section of the image file of JPEG image data;
(k) extracting, from a least significant transmitted bit-plane block of the last section of the image file of JPEG image data, an embedded signature string;
(l) decrypting the signature string extracted from the last section of the image file of JPEG image data to produce a recovered integrity checking value;
(m) comparing the recovered integrity checking value with the self integrity checking value; and
(n) authenticating the last section of the image file of JPEG image data when the recovered integrity checking value matches the self integrity checking value.

7. A system for enabling a recipient of an image file of JPEG image data to authenticate the image file of JPEG image data, the image file of JPEG image data having a first section and a second section, the first section containing a predetermined number of blocks of transformed coefficients and the second section containing a predetermined number of blocks of transformed coefficients, comprising:

a processor to produce a hashing function from the first section of the image file of JPEG image data;

said processor producing a first integrity checking value from the hashing function produced from the first section of the image file of JPEG image data;

said processor identifying the second section of the image file of JPEG image data, the second section having an encrypted signature string embedded in a least significant transmitted bit plane block of the second section;

said processor extracting, from the least significant transmitted bit-plane of the second section of the image file of JPEG image data, the embedded encrypted signature string;

said processor decrypting the extracted signature string to recover a second integrity checking value;

said processor comparing the recovered second integrity checking value with the first integrity checking value;

said processor authenticating the first section of the image file of JPEG image data when the recovered second integrity checking value matches the first integrity checking value;

said processor informing the recipient of the image file of JPEG image data that the image file of JPEG image data is authentic when each section of the image file of JPEG image data has been authenticated by comparing the recovered integrity checking value of each section with the produced integrity checking value of each section.

8. The system as claimed in claim 7, wherein the blocks of transformed coefficients within a section are contiguous.

9. The system as claimed in claim 7, wherein the blocks of transformed coefficients within a section are non-contiguous.

10. The system as claimed in claim 7 wherein said processor produces a hashing function from the second section of the image file of JPEG image data;

said processor produces a second integrity checking value from the hashing function produced from the second section of the image file of JPEG image data;

said processor identifies a third section of the image file of JPEG image data, the third section having an encrypted signature string embedded in a least significant transmitted bit-plane block of the third section;

said processor extracts, from the least significant transmitted bit-plane block of the third section of the image file of JPEG image data, the signature string embedded in the third section;

said processor decrypts the signature string extracted from the third section of the image file of JPEG image data to recover a third integrity checking value;

said processor compares the recovered third integrity checking value with the produced second integrity checking value; and said processor authenticates the second section of the image file of JPEG image data when the recovered third integrity checking value matches the produced second integrity checking value.

11. The system as claimed in claim 10, wherein said processor produces a hashing function from a third section of the image file of JPEG image data;

said processor produces a third integrity checking value from the hashing function produced from the third section of the image file of JPEG image data;

said processor identifies a fourth section of the image file of JPEG image data, the fourth section having an encrypted signature string embedded in a least significant transmitted bit-plane block of the fourth section;

said processor extracts, from the least significant transmitted bit-plane block of the fourth section of the image file of JPEG image data, the signature string embedded in the fourth section;

said processor decrypts the signature string extracted from the fourth section of the image file of JPEG image data to recover a fourth integrity checking value;

said processor compares the recovered fourth integrity checking value with the produced third integrity checking value; and said processor authenticates the third section of the image file of JPEG image data when the recovered fourth integrity checking value matches the produced third integrity checking value.

12. The method as claimed in claim 7, wherein said processor produces a hashing function from a last section of the image file of JPEG image data;

said processor produces a self integrity checking value from the hashing function produced from the last section of the image file of JPEG image data;

said processor extracts, from a least significant transmitted bit-plane block of the last section of the image file of JPEG image data, an embedded signature string;

said processor decrypts the signature string extracted from the last section of the image file of JPEG image data to produce a recovered integrity checking value;

said processor compares the recovered integrity checking value with the self integrity checking value; and said processor authenticates the last section of the image file of JPEG image data when the recovered integrity checking value matches the self integrity checking value.

* * * * *